Oct. 10, 1939.　　　S. L. KENT, JR　　　2,175,197
APPARATUS FOR WATER SPORTS
Filed March 23, 1935　　2 Sheets-Sheet 1
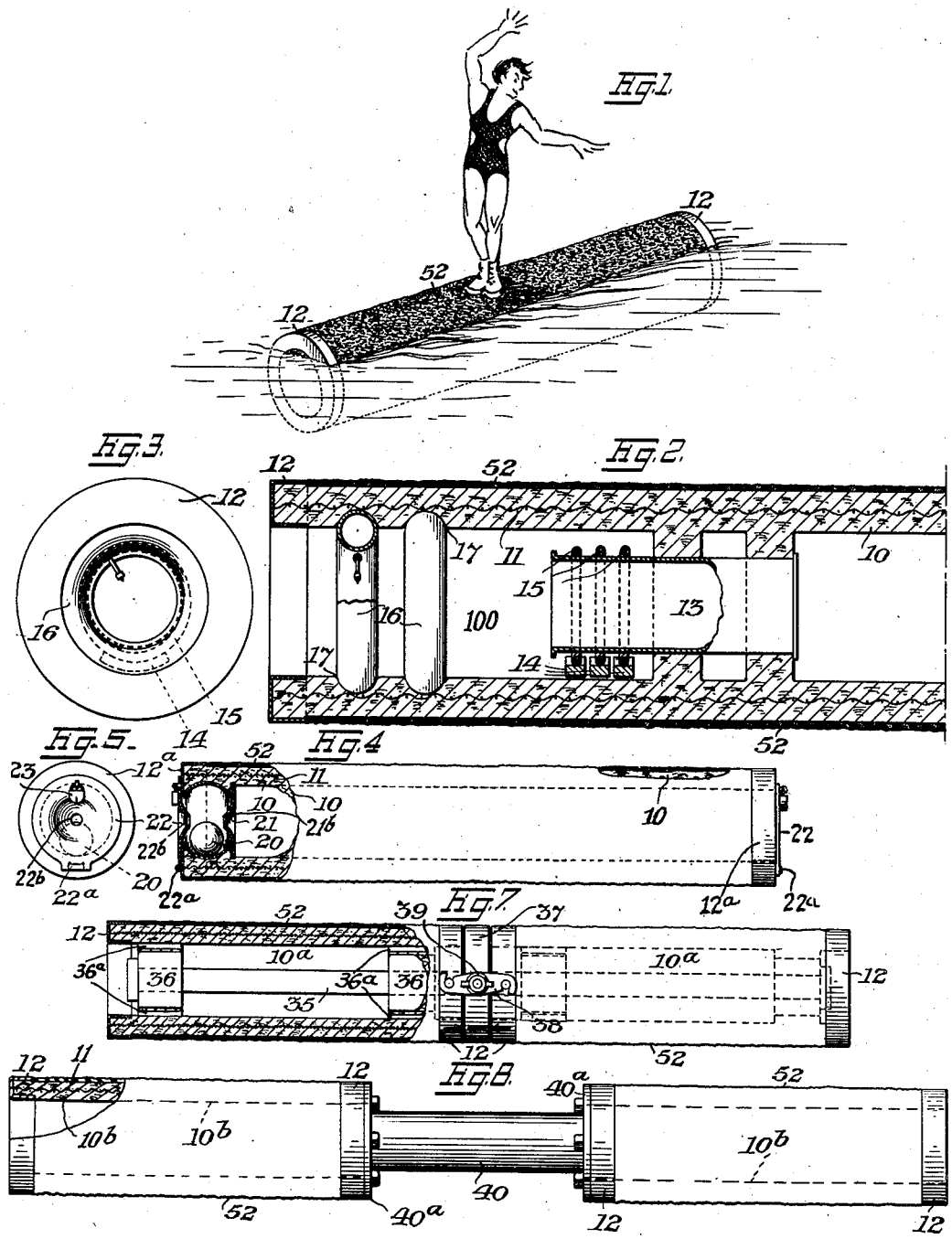
INVENTOR:
Samuel Leonard Kent, Jr.

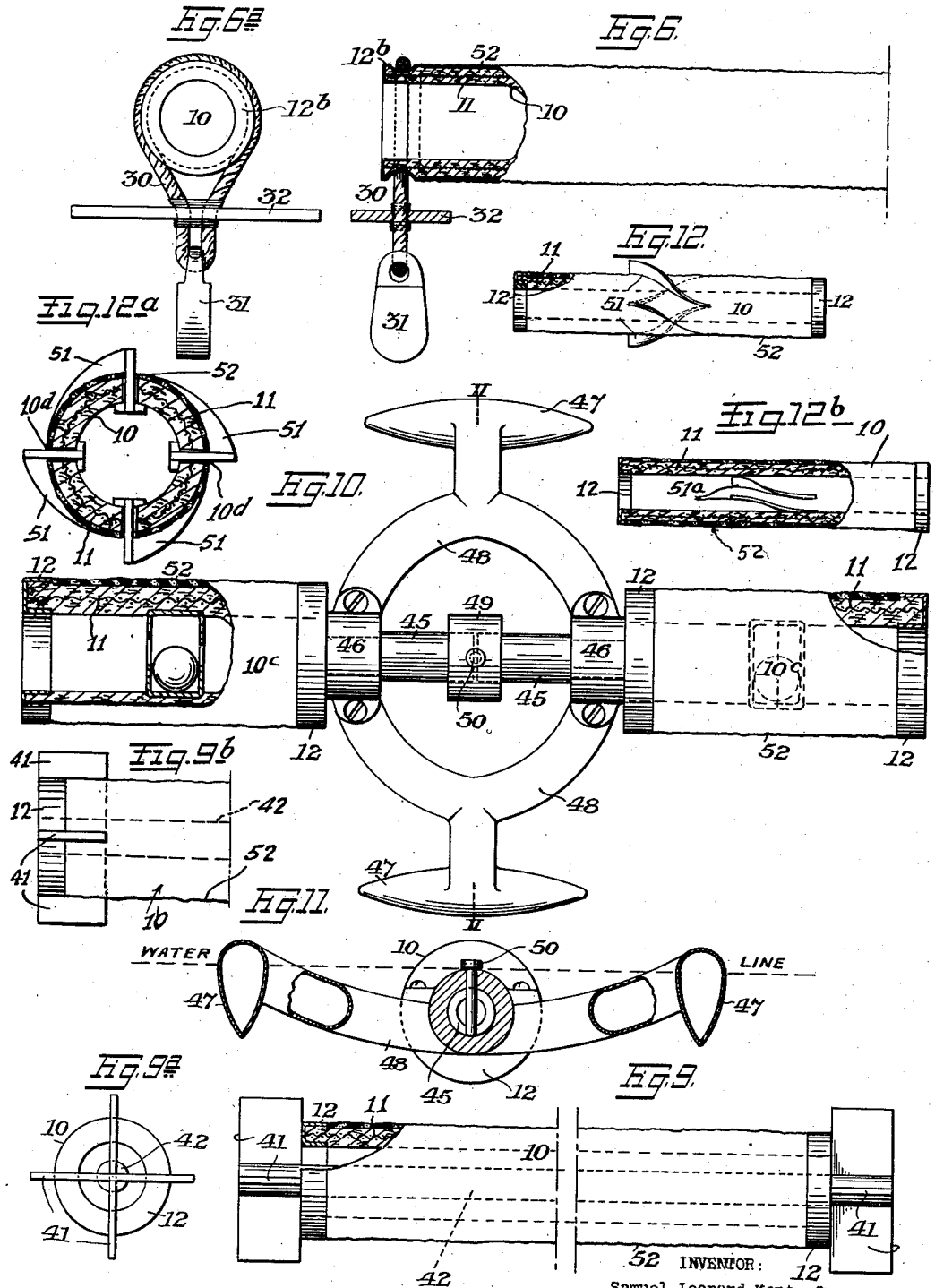

Patented Oct. 10, 1939

2,175,197

UNITED STATES PATENT OFFICE 2,175,197

APPARATUS FOR WATER SPORTS

Samuel Leonard Kent, Jr., Bryn Mawr, Pa.

Application March 23, 1935, Serial No. 12,663

22 Claims. (Cl. 272—1)

My invention relates to apparatus or devices for use in water sports, and comprises a composite, inherently buoyant, floating structure, preferably hollow freely mobile, which may be termed a "birling log."

In the floating of logs in timbering operations, it is frequently necessary for the lumber jack to walk across the logs and, in such act of walking, the log is rotated. Adepts maintain their equilibrium by rapid movement of the feet as the logs turn, and may pass from one log to another with perfect ease and assurance. This practice has given rise to a form of water sport which consists in attempting to maintain equilibrium upon a single log by walking the same, or by two persons endeavoring to maintain their equilibrium on a log while engaging in a friendly tussle or sparring match.

In the use of ordinary timber for such sport, the wood soon becomes so water-logged as to lose its buoyancy and, consequently, any attempt to continuously use an ordinary timber log for water sport is difficult, if not impossible. As the log gathers water, its buoyancy decreases and finally renders it incapable of further use. Furthermore, an ordinary log is cumbersome and quite heavy, even before it is placed in the water.

The object of my invention is to provide a structure which may be employed in water sports of this nature and, to that end, I have devised an artificial log, which may be hollow, having the desired buoyancy and capable of retaining such buoyancy in use. At the same time, such log presents all of the advantages that may be had in a timber log before the same becomes water-soaked. In addition, my improved structure is readily portable.

While it is desirable to make the artificial log as buoyant as possible initially, it must be partially submersible to an extent that will permit birling use. To this end, I propose to provide a hollow structure of buoyant material such as cork, balsa wood, or other material having a high degree of buoyancy, and to associate with such artificial log some form of weighting means whereby the position of such log with respect to the surface of the water may be definitely determined or regulated with reference to the weight of the person or persons walking the same in this form of water sport. In addition, the weighting means will have a tendency to slow up or retard the rotative movement of the log which may be quite advantageous under certain circumstances. I may also provide means for increasing the buoyancy of the log. If desired, I may provide other means that will serve to slow up or retard rotative movement of the log.

To these and other advantageous ends, I may provide the ends or other portions of the log with substantially annular chambers adapted to receive weighting means as well as means for increasing the buoyancy thereof. A plurality of weights may be carried by ropes or straps passing around an internal drum, such weights depending below the drum as the supports slip on the same with some slight friction, which will tend to slow up or retard rotative movement. In lieu of this, I may provide the ends or other portions of the interior of such hollow structure with trackways for rolling weights which will maintain themselves adjacent to the bottom of the log under the force of gravity during its rotation. Other forms of weighting means may be employed and, as a further instance of effecting such purpose, the interior of the log may be provided with chambers to receive varying quantities of suitable liquid—water, for instance—to regulate the degree of partial submergence. When water-receiving chambers are employed, they may have openings through the shell of the log to be closed by suitable plugs or stoppers insuring retention of their contents. The rolling weights internally disposed may be freely movable, and I may provide a central rod or shaft from which a plurality of detachable weights may be hung, thus permitting complete adjustment to secure proper positioning in the water for the weight of the person or persons walking the same, as well as serving to retard rotative movement. I may also employ movable weights externally disposed. The movable or rolling weights may vary in mass and, in all instances, it will be desirable to employ weights of non-rusting metal.

These and other features of my invention are more fully set forth hereinafter, reference being had to the accompanying drawings, more or less diagrammatic in character, in which:

Figure 1 is a perspective view showing my improved birling log in use.

Fig. 2 is a longitudinal-sectional view of one end of one form of birling log within the scope of my invention.

Fig. 3 is an end view of the same.

Fig. 4 is a view in elevation, partly in section, illustrating another construction or arrangement within the scope of my invention.

Fig. 5 is an end view of Fig. 4;

Fig. 6 is a view similar to Fig. 4, illustrating another weighting arrangement within the scope of my invention.

Fig. 6ª is an end view of Fig. 6.

Figs. 7 and 8 are views in elevation, partly in section, of other forms of birling logs within the scope of my invention.

Fig. 9 illustrates in elevation, partly in section, a form of birling log provided with means to slow up or retard rotative movement of the same.

Fig. 9ª is an end view of Fig. 9.

Fig. 9ᵇ is a fragmentary view illustrating a modified form of the structure shown in Fig. 9.

Fig. 10 is a plan view of another type of structure involving a modified form of apparatus for performing the act of birling.

Fig. 11 is an elevation of the structure shown in Fig. 10, partly in section on the line XI—XI.

Fig. 12 is a view in elevation of another form of birling log within the scope of my invention, and Figs. 12ª and 12ᵇ illustrate modifications of the form of structure illustrated in Fig. 12.

A simple form of my improved composite birling log is illustrated in Figs. 1 and 2, and may comprise a hollow, substantially cylindrical shell of buoyant material—cork composition, strips of balsa wood, etc.,—with weighting means to regulate partial submergence and/or retard or slow up rotative movement. A convenient size may be approximately ten (10) feet in length by two (2) feet in diameter, although other dimensions may be employed without departing from my invention. The shell 10, if of cork composition, may be molded or otherwise shaped about or around a reticulated frame, preferably cylindrical in shape, indicated at 11. This frame may be of wire of any suitable character and, if completely enclosed by the cork composition, it may be ordinary wire netting of a relatively coarse mesh. As there may be some tendency of the cork composition to disintegrate at the ends owing to wear in use, I preferably enclose said ends in ferrules 12, which may be of suitable non-ferrous metal, stainless steel, aluminum, or the like. Similar end ferrules may be employed if the birling log is made of buoyant wood.

My composite birling log so made will be quite buoyant and ride high in the water, and in order that it may be advantageously employed in water sport with the upper portion relatively close to the surface of the water, it should be weighted in order that the degree of submergence or partial submergence may be regulated. This weighting may be accomplished in many ways. In one arrangement, illustrated in Figs. 2 and 3, I have shown the hollow end of the log as providing a pocket 100, with a drum or sleeve 13 centrally supported therein and carrying weights 14 supported by ropes or straps 15 encircling the drum and located within such pocket. During rotation, the weights will gravitate to the lower side; the ropes or straps slipping on the drum but with some slight friction which will tend to slow up the rotative movement of the log. In addition to this weighting means, which may be necessary for the retarding function, it may be desirable to increase the buoyancy of the log, and, for this purpose, I may utilize inflatable tubes, such as indicated at 16, adapted to internal annular grooves 17 in the shell of the log. It will be understood, of course, that both ends of the log will be equipped with the weighting means and/or the buoyant means.

In Figs. 4 and 5, the end ferrule indicated at 12ª is shown as formed to provide an internal annular track, and this track may receive weighting means in the form of one or more freely movable metal balls 20, which will gravitate toward the bottom of the track during rotation of the log. To insure retention of the ball (or balls) within the track space, I may provide an internal wall 21 and an external cover 22, the latter being hinged at 22ª and secured in place by a padlock 23. By preference, the wall 21 and the cover 22 may be centrally apertured, as indicated at 21ᵇ and 22ᵇ, respectively. Weights of varying mass may be employed as circumstances may require.

In another arrangement, with a view of securing the desired submergence or partial submergence, I may provide end ferrules of the type shown at 12ᵇ, Figs. 6 and 6ª, each ferrule having an external groove around which a rope or band 30 may be slung, carrying a weight 31, the log turning in the bights of the ropes or bands during rotation. In such arrangement, the ropes or bands are preferably connected by braces 32 to which they will be firmly secured, and the weights will depend below these braces. The presence of the braces will afford means whereby the user may clamber onto the log, and the combined effect of the weight and brace will serve to slow up or retard rotative movement.

In the form of structure illustrated in Fig. 7, I have shown a pair of log sections 10ª arranged in alignment and connected together, each section being capable of movement independently of the other. For this purpose, the log sections may be mounted upon a rod or shaft 35 extending the full length of the combined sections, with suitable bearings 36 of an anti-friction nature between the log sections and such rod or shaft. This form of structure may be open throughout the length of the logs by longitudinally aperturing the walls supporting the bearings 36, as indicated at 36ª. If desired, the rod or shaft may carry a central disk 37 of substantially the same circumference as the log sections to which they may be connected so as to rotate together. This connection will be of a releasable nature, such as the double hook 38, so that it may be unfastened when it is desired to have the sections independently rotatable. The hook may be retained in either position by a thumb nut 39. Such form of the structure will provide means whereby two contestants may engage in wrestling or sparring while attempting to maintain their balance by rotating the logs, the object being to dislodge each other from the precarious footing on the respective log sections.

Another form of birling log is shown in Fig. 8, comprising a pair of short sections 10ᵇ connected by an interposed tubular section 40 which may have end flanges 40ª secured to the ends of the log sections; such flanges being open to allow passage through the tubular section 40. This form of structure will be provided with submerging means such as any of those shown in the other views.

While the weighting means, due to inertia of the weighting element, will have a tendency to slow up or retard the rotative movement of the log, it may be desirable to provide positive means for effecting this result, and in Figs. 9 and 9ª I have shown a birling log having vanes 41 at the ends of the same. Any convenient form or type of vane may be employed, and they may be arranged at right angles to each other, or in any other convenient manner. I do not wish to be limited to any form of mounting, although in the present instance the vanes are illustrated as being carried by a rod 42 internally disposed with respect to the hollow log and fixed thereto so as to be movable with the same. The vanes might be made of relatively thick sections of rubber or other resilient material—wood or the like. The mounting may be such as to permit removal and, instead of mounting them upon a separate element such as the rod, the ends of the log might be slotted for the reception of the same, as illustrated in Fig. 9b. Any suitable number of vanes may be employed.

In Figs. 10 and 11, I have shown another form of structure comprising a pair of logs 10c having reduced end sections 45 which may be supported in bearings 46 carried by a pontoon structure; such pontoons, indicated at 47, being connected by arms 48 carrying the bearings 46 in which the sections 45 may rotate. A collar 49 may be provided to receive the reduced end sections 45 of the logs 10c to which they may be locked against independent rotation by a releasable pin 50 engaging registering grooves in the ends of the sections 45 while the contestants mount the same. These log sections will be provided with weighting or other means to regulate the extent of submergence and to effect retardation during rotation.

Various forms of water sports may be indulged in by the use of a buoyant structure such as the composite birling log which I have provided. As ordinarily made and used, any travel of the log is transverse to its longitudinal axis and is wholly due to the rotative movement. By providing the body of the log with helical fins, such as indicated at 51 in Fig. 12, for instance, which fins are preferably located centrally of the log, rotation of the log will impart longitudinal movement thereto by reason of the fact that the fins will act as a screw propeller. These fins may be of any suitable material, probably of more or less flexible rubber, in order that injury may be avoided in case the user of the log should fall upon the same. They may be removably mounted, as shown in Fig. 12a, and may be applied externally as shown in Fig. 12, or internally of the log, as shown in Fig. 12b, especially if the latter is of relatively large size with a correspondingly sized bore.

If the log is made of cork composition, its surface may be such as to provide the desired frictional resistance to permit the user to maintain his balance by fast movement of the feet—being preferably shod with rough, heavy-soled shoes. If the cork surface is not sufficiently rough to insure the desired friction, such surface may be covered with a plastic or semiplastic body having a high degree of resilience—sponge rubber, for instance—indicated at 52. Such rubber, or similar covering, will be preferably of a consistency and thickness that will assure the desired grip by the soles of the feet, whether shod or unshod.

While I have shown helical or substantially helical fins in Fig. 12, it will be understood that straight fins, diagonally arranged with respect to the longitudinal axis of the log, may be employed without departing from my invention. These fins may be arranged for removal, or the log may be slotted for reception of the fins when not in use, as indicated at 10d, Fig. 12a, and means may be provided to hold them in the extended position when desired for use. In lieu of external fins, they may be arranged internally of my improved birling log, as indicated at 51a, Fig. 12b. These fins, in addition to their function of imparting longitudinal movement to the birling log when the latter is rotated, will also serve to retard rotative movement of the same.

In all instances, it will be desirable to cover the body of the birling log with a suitable type of marine paint or enamel, both internally and externally, with a view of preserving the same against the action of the water; such paint to be of a type that will resist the destructive action of either fresh or salt water. If the birling log is constructed of a light wood—balsa, for instance—the presence of the coating of paint or enamel will prevent water-logging of the same. If a covering of sponge or other form of rubber or the like is employed, in either form of the birling log, it may be unnecessary to apply paint on the outer surface of the body or shell of the birling log, although its presence may serve to hold the sponge rubber covering in place in lieu of other fastening means. Or advantage may be taken of the elasticity of the sponge rubber covering, which is relatively thin, and it may be stretched in place. While not necessarily, perhaps, it is within the scope of my invention to cover the sponge or other rubber covering with a coating of paint or enamel.

While I have shown a composite, buoyant, floating structure substantially cylindrical in contour, it is within the scope of my invention to make the body of other contour. In all instances, weighting means will be employed to regulate submergence or partial submergence in order that a surface may be presented that will sustain the user when properly balanced thereon.

The use to which these buoyant, floating structures may be put in water sports is infinite, and any description thereof is merely illustrative and not a limitation in any way. The log is always unstable in use, although, in the form of structure illustrated in Figs. 10 and 11, the log sections will be substantially stable when the contestants are finding their positions preliminary to the birling action and prior to removal of the pin 50.

Various modifications may be made in the construction and arrangement of my improved birling log without departing from the scope of my invention, all of which is deemed to be within the scope of the appended claims.

I claim:

1. A composite birling log substantially cylindrical in contour, open-ended and inherently buoyant, with freely movable means wholly supported by the log for weighting the same to regulate partial submergence.

2. A composite birling log substantially cylindrical in contour, open-ended and inherently buoyant, with freely movable means wholly supported by the log at each end for weighting the same to regulate partial submergence.

3. A composite, hollow, open-ended birling log of buoyant material substantially cylindrical in contour, with freely movable means wholly supported by the log and disposed within the ends of the same for weighting said log to regulate partial submergence.

4. A composite, hollow, open-ended birling log of inherently buoyant material with a friction covering externally of the same, in combination with freely movable weighting means wholly supported by the log to regulate partial submergence.

5. A composite birling log of cork, inherently buoyant, open-ended, and substantially cylindrical in contour, with freely movable weighting means wholly supported by the log to regulate partial submergence.

6. A composite, hollow birling log of cork, inherently buoyant, open-ended, and substantially cylindrical in contour, with freely movable weighting means wholly supported by the log internally disposed to regulate partial submergence.

7. A composite birling log of buoyant material, open-ended, and substantially cylindrical in contour consisting of a pair of directly adjacent independently rotatable sections, releasable means for maintaining said sections in alignment, and freely movable means wholly supported by the sections for weighting the same to regulate partial submergence.

8. A composite birling log of buoyant material consisting of a pair of open-ended sections substantially cylindrical in contour and independently rotatable, means for maintaining said sections in alignment, and buoyant pontoons operatively connected to said sections and disposed at right angles to the same.

9. A composite birling log of reinforced inherently buoyant material, open-ended, and substantially cylindrical in contour, and having retaining ferrules at the ends of the same for protecting the material of which the log is composed.

10. A composite birling log of reinforced, inherently buoyant material, open-ended, and substantially cylindrical in contour, retaining ferrules for the ends of the same for protecting the material of which the log is composed, and freely movable means wholly supported by said log for weighting the same to regulate partial submergence.

11. A composite birling log of reinforced, inherently buoyant material, open-ended, and substantially cylindrical in contour, retaining ferrules for the ends of the same, and freely movable weighting means wholly supported by said log and associated with said ferrules to regulate partial submergence.

12. A composite, hollow birling log of buoyant material substantially cylindrical in contour, annular retaining ferrules for the ends of the same; said ferrules being shaped to provide annular tracks, and freely movable weighting means to regulate partial submergence adapted to said tracks.

13. A freely mobile composite birling log of inherently buoyant material, open-ended, and substantially cylindrical in contour and having means to affect the speed of rotation.

14. A freely mobile composite birling log of inherently buoyant material, open-ended, and substantially cylindrical in contour and having internally disposed means to affect the speed of rotation.

15. A freely mobile composite birling log of inherently buoyant material, open-ended, and substantially cylindrical in contour and having vanes or blades to affect the speed of rotation.

16. A freely mobile composite birling log of inherently buoyant material, open-ended, and substantially cylindrical in contour and having a plurality of vanes at each end to retard or slow up the speed of rotation.

17. A freely mobile composite birling log of inherently buoyant material, open-ended and substantially cylindrical in contour and having internally disposed vanes or blades to effect longitudinal movement of the log when the latter is rotated.

18. A freely mobile composite birling log of inherently buoyant material, open-ended, and having a plurality of internal pockets, and freely movable weighting means disposed in said pockets.

19. A freely mobile composite birling log of inherently buoyant material, open-ended, and having a plurality of internal pockets for the reception of movable weighting means, axial supports within said pockets, and freely movable supports for said weights circumferentially slidable on said axial supports.

20. A freely mobile composite birling log comprising a plurality of buoyant, hollow, and open-ended sections substantially cylindrical in contour and independently rotatable, means for maintaining said sections in alignment, and freely movable means wholly supported by said sections for independently weighting the same to regulate the degree of partial submergence.

21. A composite birling log of buoyant material substantially cylindrical in contour, metal ferrules at the ends of said log with external annular seats, supports movably mounted with respect to said log arranged in said annular seats, and weights carried by said supports.

22. A composite birling log of inherently buoyant material, open-ended and substantially cylindrical in contour consisting of a pair of directly adjacent independently rotatable sections, and releasable means for holding said sections against independent movement.

S. LEONARD KENT, JR.